July 30, 1963   M. C. A. THUILLIER   3,099,084
METHOD OF MANUFACTURING BITS FOR SOLDERING IRONS
Filed Aug. 25, 1959

3,099,084
METHOD OF MANUFACTURING BITS FOR SOLDERING IRONS
Marie Charles Alfred Thuillier, Place Danton, Bois d'Arcy, Seine-et-Oise, France
Filed Aug. 25, 1959, Ser. No. 835,956
Claims priority, application France Sept. 4, 1958
5 Claims. (Cl. 29—528)

The present invention concerns a process for manufacturing bits for soldering irons or soft soldering machines.

Good heat conducting metals, suitable for the manufacture of bits for soldering irons or soft soldering machines are not sufficiently resistant to wear, corrosion and oxidation.

It has already been proposed to produce soldering bits comprising a core of a high conductive metal enclosed in a jacket of a metal more resistant to wear, corrosion and oxidation.

It has been proved that a soldering bit formed from a thin steel jacket with a silver core is particularly advantageous from the point of view of rapid functioning and that the useful life of such bits is considerably greater than that of the usual soldering bits.

Results which are less satisfactory although occasionally adequate have been obtained by using another metal of great durability for the jacket, such as, for example, nickel, or by using other soft metals which are good heat conductors for the core.

In all these cases, nevertheless, a difficulty was encountered in obtaining a close contact between the core and the jacket, which was found to be prejudicial to good functioning and to the life of the soldering bit.

By running in and fusing the soft metal intended to form the core into a jacket of hard metal, as in the U.S. Patent 2,523,638, it is difficult to prevent the formation of an oxidised layer between the two metals and it is not possible to obtain a sufficiently homogeneous connection between the two metals.

In the U.S. Patent 2,523,638 it has been proposed to insert a copper rod in the jacket and then bring the jacket and rod up to the melting point of the copper. This process is not possible with a jacket so thin as desirable, because such a jacket would be distorted or even destroyed by the required high temperature. It is also not possible with a jacket so slim and sharp as wanted, for it would be impossible to prevent air bubbles to remain between the jacket and the core.

It is, therefore, one object of the present invention to provide a process for manufacturing bits for soldering irons or soft soldering machines which permits the realization of bits for soldering irons of the type above described, having a form so slim and sharp as wanted, with a jacket so thin as desirable, and with a close and homogeneous superficial connection between the jacket and the core.

It is another object of the present invention to provide a process for the manufacture of bits for use with soldering irons or soft soldering machines which comprises the steps of forming a crucible or shell of a very hard metal having a relatively high fusion point, introducing into the crucible, in a solid state, a metal intended to constitute a core of soft, good heat conducting metal having a relatively low fusion point, subsequently heating the crucible to a temperature near to the point of fusion of the metal of which it is constituted and higher than the point of fusion of the metal intended to constitute the core and the formation of a superficial alloy between both metals, as far as the complete fusion of the core, then cooling the integral assembly to achieve the solidification of the metal of the core in the crucible, and subsequently shaping said integral assembly. The crucible may be brought to white welding heat during the heating process.

The integral assembly may be subsequently shaped by drawing, molding, stamping or the like to the final form desired.

A bar, one extremity of which is held against the bottom of the cavity of the crucible during heating, may be used to constitute the core and pressure may be exerted on the bar to cause the extremity thereof to be crushed in the bottom of the crucible as fusion occurs.

With these and other objects in view which will become apparent in the following detailed description, the present invention will be clearly understood in connection with the accompanying drawings, in which.

Figure 1:
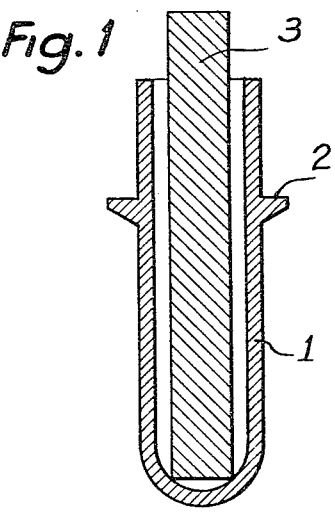
FIGURE 1 is a vertical section of a crucible or shell formed from the metal intended to constitute the jacket of a soldering bit into the interior of which is introduced a metal bar intended to constitute the core.
Figure 2:
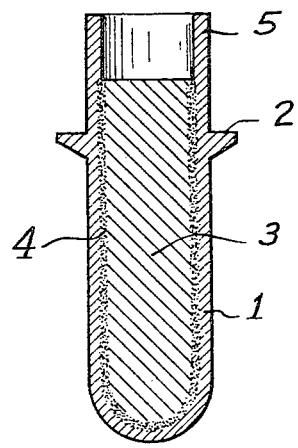
FIG. 2 is a corresponding vertical section of the block obtained after fusion of the metal intended to constitute the core with the jacket.

Referring now to the drawing, a crucible or shell 1, preferably of steel, is in the form of a hollow cylinder closed at its lower extremity and open at its upper extremity. A small collar 2 is provided in the region of the open extremity of the crucible 1. This crucible 1 may be obtained, for example, by stamping from a circular blank. It might equally well be obtained by cutting out, drilling or milling in a block of steel or other very hard metal.

A bar 3 preferably of silver, is introduced to this crucible 1, one extremity of the bar being against the bottom of the cavity of the crucible 1. The volume of this bar 3 is slightly less than the volume of the cavity of the crucible 1.

The crucible 1 is heated preferably in a reducing flame and is carried to white welding heat, that is to say, to a temperature near to its point of fusion and higher than the fusion point of the metal constituting the bar 3. The bar 3 commences to melt at its extremity in contact with the bottom of the cavity of the crucible 1 and this extremity is crushed in proportion to the fusion while the fused molten metal rises in the cavity of the crucible 1, expelling the air contained in the crucible and allowing the oxidised parts which form to float.

By reason of the temperature to which the crucible 1 is raised, a surface alloy between the metal of the crucible 1 and the metal of the bar 3 is produced, the latter, after cooling and solidification, forming a solid block with the crucible. A superficial alloy 4 is formed between the two metals.

Figure 3:
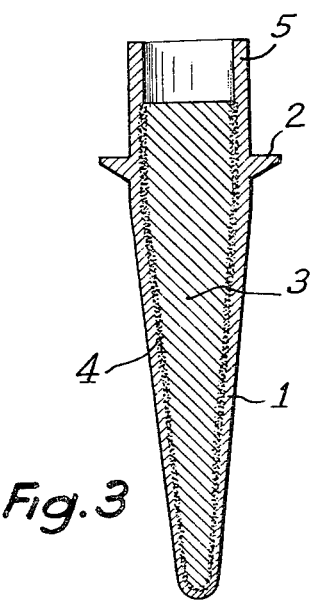
FIG. 3 is a corresponding vertical section of a soldering bit obtained by shaping the block shown in FIG. 2.

The solid block thus obtained is then shaped into a soldering bit shown in FIG. 3 by drawing, molding or stamping, etc.

In the course of these operations the metal issuing from the bar 3 and forming the core of the soldering bit, comes into close contact with the metal of the crucible 1 which forms the jacket of the soldering bit following the deformation of the latter, the thicknesses of the core and of the jacket remaining in a substantially constant ratio. Very finely drawn out shapes, the jacket of which is of slight thickness, may thus be obtained.

Figure 4:
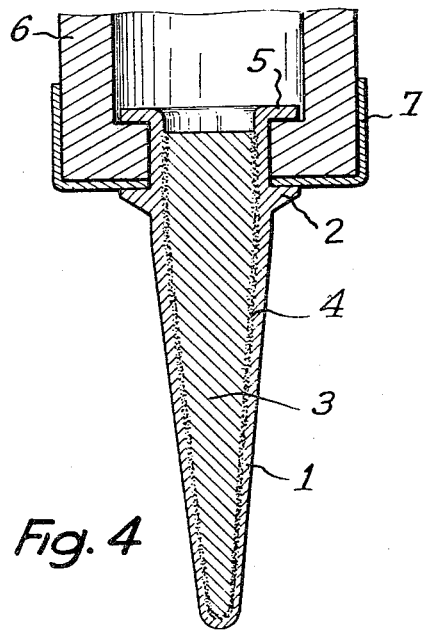
FIG. 4 is a corresponding vertical section of the soldering bit riveted to a heating element.

Since the volume of the bar 3 is less than the volume of the cavity of the crucible 1, the latter is provided at the open extremity with a spigot 5 which may be utilised in co-operation with the small collar 2 to serve as a shoulder for riveting the soldering bit onto a heating element 6, for example in copper, as shown in FIG. 4. In this example a steel socket 7 has been interposed between the small collar 2 of the soldering bit and the heating element 6 to give more rigidity to the assembly and to protect the heating element against attack by the solder. Such a mounting avoids the necessity of brazing, which is advantageous, since brazing is attacked by solder. The soldering bit is thus fixed securely to the heating element. It is not necessary to replace the bit, because it has been proved that a soldering bit thus constituted with a jacket, preferably of steel, closely united with a core, preferably of silver, without the interposition of other materials, is practically indestructible.

While a particular embodiment of this invention has been illustrated and described herein, it is intended that this invention be not limited to such disclosure, and changes and modifications can be made and incorporated within the scope of the claims.

I claim:
1. A process for the manufacture of bits for use with soldering irons or soft-soldering machines, comprising the steps of
    forming an elongated thin-wall, hollow shell of a very hard metal having a relatively high fusion point, said shell having a closed bottom,
    introducing into said shell a core of soft, heat conducting metal being in its solid state and having a relatively low fusion point, pressing said core against said bottom,
    and then heating said shell to a temperature close to the point of fusion of said hard metal and higher than the point of fusion of said soft metal,
    maintaining a pressure on said core of soft, heat conducting metal in order to provide a pressure contact between said soft metal with said hard metal of said shell to produce a surface alloy between said metals, and
    cooling the integral assembly to bring about solidification of said metals.
2. The process, as set forth in claim 1, wherein said heating step of said shell is extended to white welding heat of said hard metal.
3. The process, as set forth in claim 1, wherein said core of soft metal is introduced into said shell in form of a bar,
one extremity of the latter is held against the bottom of said shell during said heating step,
and crushing said extremity of said bar due to the exertion of said pressure in the bottom of said shell.
4. A process for the manufacture of bits for soldering irons, comprising in combination the steps of forming a substantially cylindrical thin-walled hollow shell of a hard metal having a relatively high fusion point, said shell having a closed bottom and being open at the top, supporting said shell with its top up, introducing into said shell a core comprising a bar of relatively soft metal having high heat conductivity and a fusion point substantially below that of said hard metal, said bar having a volume slightly less than the cavity in said shell and a cross-section less than that of said cavity, pressing the lower end of said bar against the bottom of said shell, heating said shell to a temperature substantially above the fusion point of said soft metal and below but close to the fusion point of said hard metal while continuing to press said bar against the bottom of said shell whereby fusion of said bar commences at the bottom of said shell and the fused metal progressively rises in said shell and thereby expells the air contained in said shell and allows any oxides which may be formed to float, continuing said heating to form an alloy of said hard metal and said soft metal at the interface between said metals, and thereafter cooling the integral assembly to solidify said metals.
5. The process as set forth in claim 4, comprising the further step of pressure-forming said integral assembly to a substantially conical shape with portions of smaller cross-section than the original form while maintaining a substantially constant ratio between the thickness of said shell and said core.

References Cited in the file of this patent
UNITED STATES PATENTS

| | | |
|---|---|---|
| 1,308,637 | Merkt | July 1, 1919 |
| 1,336,931 | Starkey | April 13, 1920 |
| 1,350,181 | Remane | Aug. 17, 1920 |
| 2,306,883 | Holmes | Dec. 29, 1942 |
| 2,523,638 | Tice | Sept. 26, 1950 |
| 2,528,406 | Wulff | Oct. 31, 1950 |
| 2,662,500 | Fort et al. | Dec. 15, 1953 |